United States Patent [19]

Lindstrom et al.

[11] Patent Number: 4,575,798

[45] Date of Patent: Mar. 11, 1986

[54] EXTERNAL SORTING USING KEY VALUE DISTRIBUTION AND RANGE FORMATION

[75] Inventors: Eugene E. Lindstrom, Saratoga, Calif.; Jeffrey S. Vitter, Providence, R.I.

[73] Assignee: International Business Machines Corporation, Armonk, N.Y.

[21] Appl. No.: 500,741

[22] Filed: Jun. 3, 1983

[51] Int. Cl.[4] .............................................. G06F 7/08
[52] U.S. Cl. .................................................. 364/300
[58] Field of Search ......... 364/200, 300, 900 MS File

[56] References Cited

U.S. PATENT DOCUMENTS

| | | | |
|---|---|---|---|
| T913,007 | 8/1973 | McKellar | 364/300 |
| T920,010 | 3/1974 | Conner, II | 364/300 |
| 2,983,904 | 5/1961 | Moore | 364/900 |
| 3,400,371 | 9/1968 | Amdahl et al. | 364/200 |
| 3,662,402 | 5/1972 | Bond et al. | 364/300 |
| 4,168,535 | 9/1979 | Belser | 365/15 |
| 4,210,961 | 7/1980 | Whitlow et al. | 364/300 |

OTHER PUBLICATIONS

Chang et al., "Associative Search Bubble Devices for Content Addressable Memories", IBM Technical Disclosure Bulletin, vol. 18, pp. 598–602, Jul. 1975.
Doty et al., "Magnetic Bubble Memory Architectures for Supporting Associative Searching of Relational Databases", 29 IEEE Transactions on Computers, pp. 957–970, Nov. 1980.
Lin, "Sorting With Associative Secondary Storage Devices", Proceedings of AFIPS, National Computer Conference, pp. 691–695, 1977.
Knuth, "The Art of Computer Programming, vol. 3: Sorting and Searching", Addison-Wesley, 1973.
Knuth, "The Art of Computer Programming, vol. 2: Seminumerical Algorithms", Addison-Wesley, 2nd Edition, 1981.
Vitter, "Faster Methods for Random Sampling", Technical Report CS-82-21, Brown University, Aug. 1982.

Primary Examiner—Raulfe B. Zache
Attorney, Agent, or Firm—R. Bruce Brodie

[57] ABSTRACT

A method for executing an external distribution sort in which the data to be rearranged includes keyed stored records that can be accessed on associative secondary storage. The method steps include random sampling of a certain number of keys and internally sorting the sampled keys; forming equal sized partitions of records in a single pass, each partition of which can fit within internal CPU memory and constitute a range of key values; and associatively retrieving all of the records whose keys lie within a range and internally sorting said records.

7 Claims, 6 Drawing Figures

BALANCED TREE CREATED DURING SAMPLE PHASE

BALANCED TREE CREATED DURING SAMPLE PHASE

POINTER LIST CREATED DURING SAMPLING PHASE

{ Initialize the counts }
for $i := 1$ to $S + 1$ do $P[i].count := 0$;

{ Process each key and increment its range count }
for each key in the file do
    begin
    Perform a binary search on the pointer list $P$ in order to find
    the value $i$ such that $P[i-1].key <$ "key value" $\leq P[i].key$;
    if $P[i].count < V$ then $P[i].count := P[i].count + 1$
    end;

COUNTING SUBPHASE OF THE RANGE FORMATION PHASE

FIG. 3

{ Initialize }
Output key value $-\infty$;
$i := 1$;
$P[S + 2].count := F + 1$;
while $i \leq S + 1$ do
    begin { Form next combined range }
    $sum := P[i].count$;
    if $sum > F$ then { Process overflow range }
        Output a special marker, $sum$, and $P[i].key$
    else begin { Process non-overflow range }
        while $sum + P[i+1].count \leq F$ do
            begin
            $sum := sum + P[i+1].count$;
            $i := i + 1$
            end;
        Output $P[i].key$
    end;
    $i := i + 1$
    end;

COMBINATION SUBPHASE OF RANGE FORMATION PHASE

FIG. 4

EXTERNAL SORTING USING KEY VALUE DISTRIBUTION AND RANGE FORMATION

TECHNICAL FIELD

This invention relates to a computer implementable distribution method for externally sorting very large files.

BACKGROUND OF THE INVENTION

Sorting is the process of arranging items in an "order". The entities of interest are records each having an associated key value. The sorting objective is to determine a permutation of records which puts the keys in a non-decreasing order. A sorting activity is characterized by the manner by which the rearrangement is accomplished, as well as whether it may be accomplished in its entirety within the internal memory local to the CPU executing the sort, that is, where the data neatly fits into the random access internal (main) memory of a CPU.

A "distribution sort" separates records into contiguous ranges so that all records in one range have keys that are less in value than the keys of the records in the next range. On the other hand, a "merge sort" combines two or more linearly ordered lists such that the combined list is also linearly ordered. Typically, a two-way merge sort compares pairs of items and puts each pair in order, then merges pairs so that the resulting quadruples are in order, then merges quadruples into sorted octuples, and so on, until there are no more merges possible.

An "external sort" refers to sorting techniques applicable to files of data that exceed the capacity of primary or internal memory and rely upon secondary storage, such as DASD, tapes and drums during the sorting process. In merge sort, which is one type of external sorting, parts of a file are read into internal memory, ordered internally, and then rewritten on external devices or secondary storage. One technique, "replacement-selection", produces an intermediate file containing one or more ordered lists (strings) from the unordered "input file". Replacement-selection produces ordered strings of varying lengths, the average length being double the capacity of internal memory. Reference should be made to E. F. Moore, U.S. Pat. No. 2,983,904, 1961. The strings can optimally be merged into one ordered string by forming a "minimal merge Huffman tree". The minimal merge trees are constructs with terminal nodes representing string lengths and arranged so that the value of the merge tree is as small as possible.

Most external sorting methods used for data stored on disk drives are merge based. As suggested, these require the generation of several initial sorted strings using replacement-selection and then repeatedly merging the string until only one string remains. Whitlow et al, U.S. Pat. No. 4,210,961, "Sorting System", issued July 1, 1980, described a classical merge-based external sorting method.

On the other hand, associative memory devices have been used in both sorting and searching applications. Chang et al, "Associative Search Bubble Devices for Content Addressable Memories", 18 IBM Technical Disclosure Bulletin, pp. 598-602, July 1975, described magnetic bubble memory devices both as a word and serial by bit content addressable memory. Also, Belser, U.S. Pat. No. 4,168,535, "Non-volatile Bubble Domain Memory System", issued Sept. 18, 1979, depicts state-of-the-art multiple minor/major loop bit storage arrays. Likewise, Doty et al, "Magnetic Bubble Memory Architectures for Supporting Associative Searching of Relational Databases", 29 IEEE Transactions on Computers, pp. 957-970, Nov. 1980, substantially extended a parallel architecture of magnetic bubble memories to support associative searching in relational databases. C. S. Lin, "Sorting With Associative Secondary Storage Devices", Proceedings of AFIPS, National Computer Conference, 1977, pp. 691-695, described a computer implementable method for executing a distribution sort using a histogram of keys and associative searching on a head-per-track disk. Lin is operable only when key values are evenly distributed.

THE INVENTION

It is an object of the invention to devise an external sorting method applicable to very large files associatively accessed from secondary storage, which method substantially reduces the running time of a sort function.

The above object is realized by a method for executing a distribution sort. The data to be rearranged includes keyed stored records that can be accessed on associative secondary storage. The method utilizes a random sampling of a certain number of keys and internal sorting of the sampled keys; forming equal sized partitions of records in a single pass, each partition fitting within the CPU main memory, by obtaining a histogram of the keys in ranges of key values and combining contiguous lesser populated ranges; and associatively retrieving all of the records whose keys lie within a range and internally sorting the retrieved records.

The method is adaptive in that it is very fast irrespective of the order of the keys or the distribution of the key values. The internal sorting of the sampled keys is followed by the construction of a sequential pointer list that points to the keys in sorted order. Relatedly, the forming of record partitions by obtaining a histogram of keys and ranges of key values includes performing for each key a binary search in internal memory on the pointer list in order to ascertain the range associated with the key. Advantageously, this distribution method is optimized with respect to associative storage and not with conventional DASD.

BRIEF DESCRIPTION OF THE DRAWING

FIG. 3 gives a Pascal pseudo-code program sequence for executing the counting subphase in range (bucket) formation;

FIG. 4 sets out a Pascal pseudo-code program sequence for executing the combination subphase in range (bucket) formation;

DESCRIPTION OF THE PREFERRED EMBODIMENT AND INDUSTRIAL APPLICABILITY

The method of this invention is executable upon a computing system of the type including one or more CPU's, each having an internal memory, input/output channel, a control unit, direct access storage devices, and other I/O devices coupled thereto. Such a system is described in Amdahl et al, U.S. Pat. No. 3,400,371, issued Sept. 3, 1968, and entitled "Data Processing System". The Amdahl system includes as a resource all of the facilities of either the computing system or of an operating system running thereon which are required for the execution of a process. Typical resources include an internal memory, I/O devices, a CPU, data sets, and control or processing programs.

Sorting, as a set of functions, can be invoked by any executing application process, the operating system, or a database management system. Typically, an executing function invokes the sort in the name of a file. The operating system ascertains the location of the file and, if it cannot fit in internal memory, then the "external sort" function is invoked.

The inventive method requires an associative secondary storage device. This can be approximated either by large DASD with a logic per track capability or by a magnetic bubble memory (MBM). The method is described with reference to three phases. These are respectively, (1) a sample phase, (2) a range (bucket) formation phase, and (3) an internal sort phase. In the sample phase, a certain number of the key values are randomly sampled and the sampled keys are sorted internally. In the range formation phase, in a single pass through the file counts are taken for how many records belong to each range, as defined by the sorted sample. Using this histogram, contiguous ranges are combined to obtain larger ranges up to the point where each range contains roughly the number of records that can fit into internal memory. Lastly, in the internal sort phase for each range in the order of increasing key values, an associative search through the file is performed in order to retrieve into internal memory all of the records whose key values lie within the range. The records are then sorted internally and appended to the output file.

The detailed description includes an analysis and discussion of the method with modifications improving its time/space efficiency, the use of magnetic bubble memory as associative secondary storage implementation, and improvements in the effectiveness of the internal sort phase.

In this discussion, it will first be assumed that each record has a fixed length of R bytes, while the key fields consist of $K<R$ bytes. Also, the CPU has an internal memory size of M bytes. The file to be sorted consists of N records. Further, the number of records F that can be internally stored is approximately M/R. Lastly, the number of sampled keys S is approximately M/K.

The Sample Phase

Figure 1:
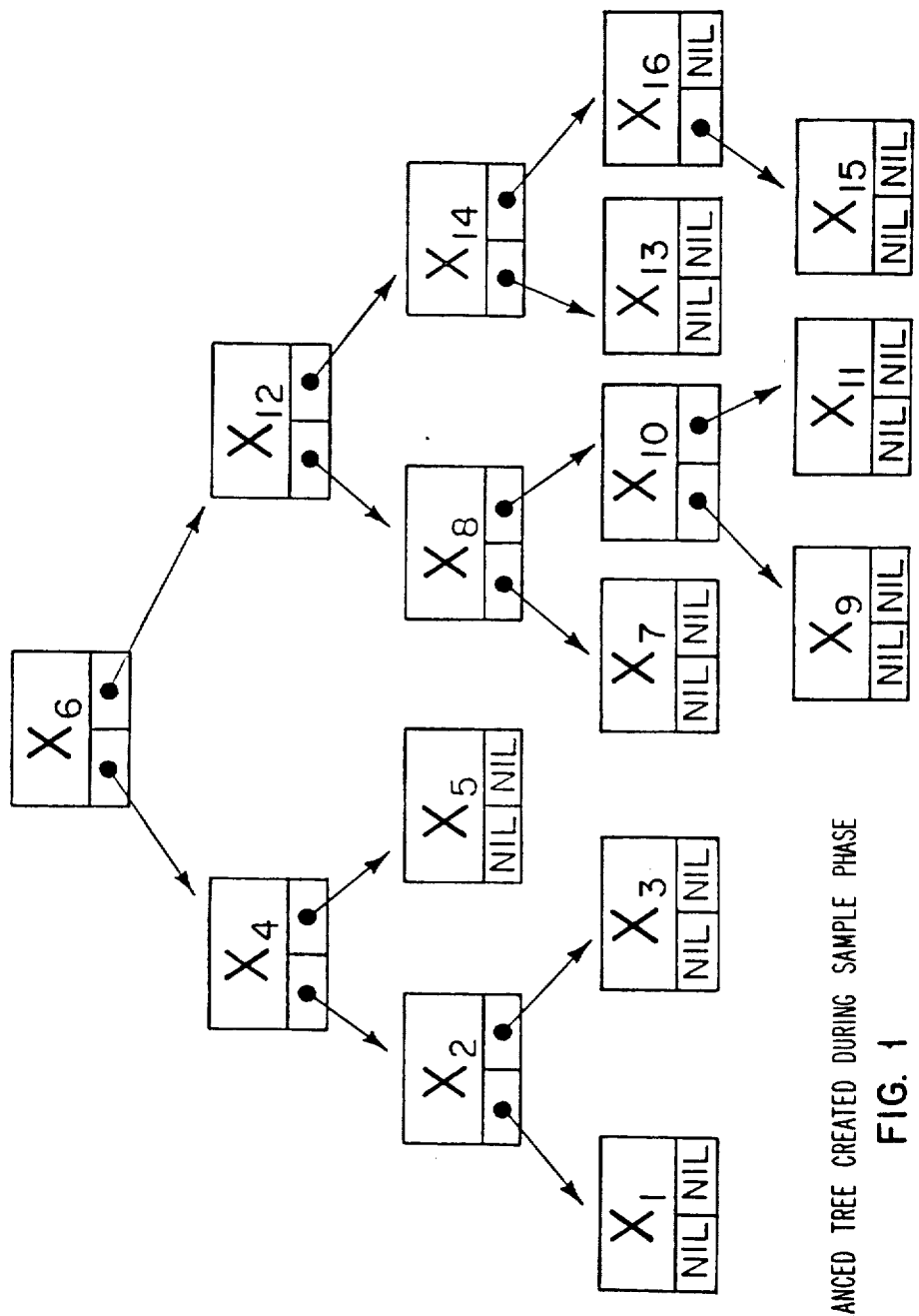
FIG. 1 shows a balanced tree of sorted sampled keys including necessary pointers created during the sample phase.
Figure 2:
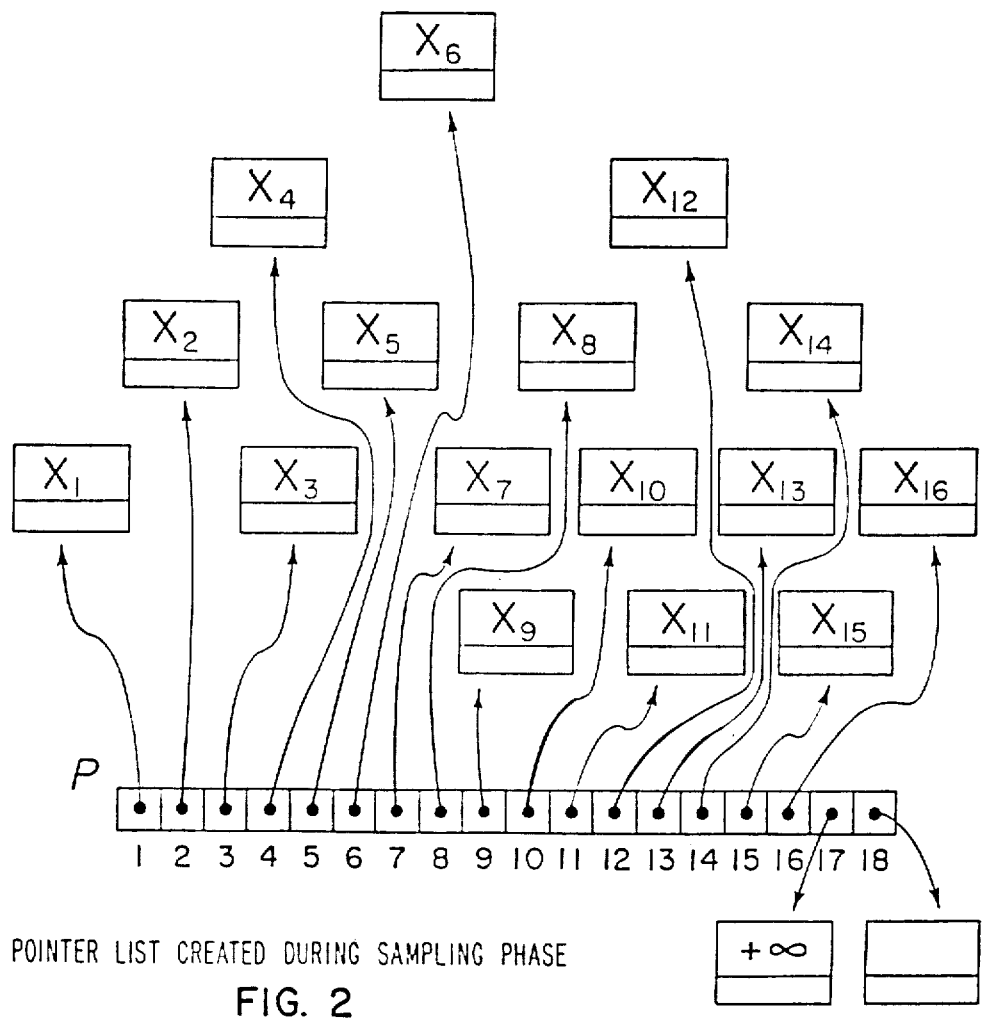
FIG. 2 illustrates the pointer list created during the sample phase.

A sample of S keys, where S is approximately M/K, is taken using a random sampling method. The correct choice of the value of S, which also determines the amount of internal memory M required, is central to this method and will be explained subsequently. This sample, stored in internal memory, is sorted using a balanced tree, such as an AVL or an RB tree. Reference should be made to D. E. Knuth, The Art of Computer Programming, Volume 3: Sorting and Searching, Addison-Wesley, 1973. The sorting by way of a balanced tree permits sorting time to overlap the sampling. For purposes of completeness, it is appreciated that a "tree" is a connected graph with no cycles. Further, a "directed tree" is a directed graph that contains no cycles and no alternate paths. A directed tree has a unique node (the root) whose successor set consists of all other nodes. In this invention, each node in the balanced tree requires storage space for the key as well as two pointers for the sorting. Parenthetically, an ancestor descendent nomenclature is used in describing nodal relations. Thus, it is said that the key value of the left son is less than or equal to the key value of the parent. Likewise, the key value of the right son is greater than the key value of the parent. An example of the balanced tree arrangement of keys and pointers is set out in FIG. 1. The last part of the sampling phase requires an in-order traversal of the balanced tree in order to create a sequential list of pointers that are directed to the keys in the tree in increasing order. An example of the pointer list corresponding to the balanced tree in FIG. 1 is given in FIG. 2.

As may be recalled, this step involves random sampling of S keys and internal sorting of the sampled keys. In the magnetic bubble memory form of associative storage each record is stored in a random array of the MBM. An array is pictured in FIG. 5 and will be described subsequently. The sampling step is performed while the records are being written onto the MBM. If the records of an input file already reside on the MBM, it is assumed that they were stored on random arrays. If not, then they should be scrambled randomly among the arrays.

The sampling on such a device is accomplished as follows:

First, the number of records to be selected for the sample from each array is chosen at random, based on the multinomial distribution. Methods for generating an independent multinomial random variate are given in D. E. Knuth, The Art of Computer Programming, Volume 2: Seminumerical Algorithms, Addison-Wesley, 2nd edition 1981. Then a sequential random sampling method is used to select the desired number of keys from each array. Reference in this regard should be made to Algorithm D in J. S. Vitter, "Faster Methods for Random Sampling", Technical Report CS-82-21, Brown University, August 1982. The sampled key values are then read into internal memory and inserted into the balanced tree, as explained above.

Range (Bucket) Formation Phase

This phase is divided into a counting subphase and a combination subphase. The sampled key values that were sorted in the sample phase serve to partition a file into $S+1$ ranges. In this regard the sorted key values are denoted by $X_1, X_2, \ldots, X_S$. Also $X_0$ is set equal to $-\infty$ while $X_{S+1}$ is set equal to $+\infty$. For each value i in the closed interval from 1 to $S+1$, the ith range is defined to be the set of records whose key value is in the semi-closed interval $X_{i-1}$ to $X_i$.

Each range contains an average of N/S records with a standard deviation of approximately N/S. The value of S is chosen such that N/S is very much smaller than the number F of records that can be contained within the internal memory. This will be discussed subsequently.

The sorted order of keys is representable by a sequential pointer list created at the end of the sample phase. The keys, however, are still stored in the balanced tree.

Significantly, the counting subphase consists of processing each key on the associative device and performing either a Fibonaccian or uniform binary search on the pointer list in order to ascertain which small range contains the key. The count for that range is incremented by 1. Since the pointer fields in the balanced tree are no longer needed, the count for a range can be stored in the tree in the pointer fields of the key defining the upper limit of the range. This is true except for the counter of the highest-ordered range which requires a separate storage location.

The sequence of steps in the counting subphase may be illustrated by reference to the Pascal pseudo-code in FIG. 3. In this regard, the pointer list created at the end of the sample phase is denoted by P. Each element of P is the address of a record with a key field and a count field. For each i between 1 and $S+1$, P[i] key is the ith sampled key value in sorted order. The value $P[S+1]$key is assumed to be $+\infty$, which is any number greater than the largest possible key value. It is assumed that the largest value V that can be stored in P[i]count, for each i, is greater than F, which is the number of records that can fit in internal memory during the internal sort phase.

The purpose of the counting subphase is to set the value of P[i]count, for each i between 1 and $S+1$, to the number of records whose key value is in the interval $\{P[i-1]$ key $<$"key value"$\leq P[i]$key $\}$ if that number is at most V, and to the value V otherwise.

In the combination subphase, contiguous ranges are grouped together to form larger ranges. Each grouping combines as many small ranges as possible so that the resulting combined range contains at most F records. The number of records in each resulting range is in most cases approximately equal to F. Parenthetically, each range that already contains more than F records is termed an "overflow range". It will be established subsequently that the average number and the standard deviation of the number of overflow ranges is less than 1. Also, the keys that define the intervals for the ranges are output sequentially to a conventional disk or tape unless there is space in the internal memory. In the case of an overflow range, the count or a special marker is output along with the key that defines the upper limit of the range.

A process for executing the combination subphase may be illustrated by reference to the Pascal language pseudocode sequence shown in FIG. 4. In this Pascal-like sequence, the values P[i] key, for each i between 1 and S, are the sampled key values in sorted order. It is assumed that P[0] key: $=-\infty$ and P[S+1] key: $=+\infty$, which are numbers less than and greater than any possible key value. The largest number that can be stored in P[i] count for each i is denoted by V. The value P[i] count, for i between 1 and $S+1$, is the maximum of V and the number of records whose key value is in the range $\{P[i-1]$ key $<$"key value"$<P[i]$ key$\}$. The value of V is greater than F, which is the number of records that can fit in internal memory during the internal sort phase. For programming simplicity, it is assumed that there is an extra count field $P[S+2]$ count.

The output of the combination subphase is the list of key values that define the endpoints of the combined ranges.

If the records are variable-length rather than fixed-length, the method can be modified in the following way. In the counting subphase the count for each range should count the total space occupied by the records in that range, not the number of records in the range. In the combination subphase, as many contiguous ranges as possible should be combined so that the records in each of the resulting ranges can fit in internal memory.

The Internal Sort Phase

In this phase, the keys which define the ranges are processed sequentially. For each range, the records therein are retrieved by an associative search, sorted, and then appended to the output file. If the range is not an overflow range, then all of its records fit within internal memory and can be sorted internally. In this regard, replacement selection can be used for sorting the records within a range because there is no need to reinitialize for each range. When the records within a range have been retrieved from secondary storage, retrieval of the records of the next range can begin. This relies upon the fact that all the key values from the first range are less than or equal to all the key values from the second range as well as upon the fact that the records within a range can fit in the replacement selection tree. In the rare event that a range is an overflow range, the range can be sorted either by applying the inventive method recursively or by using a conventional merge sort. As mentioned earlier, the number of such overflow ranges is almost always less than 1.

The Choice of Sample Size S and Internal Memory Size M

The number S of sampled keys is chosen so that the amount of internal memory M required is minimized subject to the objective that the average number and the standard deviation of the number of overflow ranges should be less than 1. The values of M and S are related by the formula $$S=(M-2B)/(K+3P). \quad (1)$$

The values of M and S can be computed by solving two equations in two unknowns, M and r, where r is defined to be $F(S+1)(N+1)$. The first equation, which guarantees that the aforementioned objective can be achieved, is $$r - \ln r = \ln\left(\frac{(N+1)(R+P)}{M-2(B+B')}\right) \quad (2)$$

where B and B' are the sizes of the input and output buffers, and P is the number of bytes per pointer field. The second equation $$(M-2B+K+3P)(M-2(B+B'))=r(N+1)(R+P)(K+3P)$$

guarantees that the S sampled keys can be sorted internally. The approximate value of M that is obtained by solving these two equations is $$M \approx \left[\ln\left(\frac{NR}{K}\right) + \ln\left(\frac{\ln(NR/K)}{2}\right)\frac{NRK}{2}\right]^{\frac{1}{2}} + 2B' \quad (4)$$

If more internal memory is available than the value of M computed above, say, kM bytes of internal memory are available, then the total sorting time will decrease by roughly a factor of k.

Associative Secondary Storage Implemented in Magnetic Bubble Memory

Associative secondary storage devices process queries termed either associative searches or range queries of the form:
Given values a and b, retrieve all records such that a "key value" ≦ b.

This query is performed once for each range during the internal sort phase of the method. This accounts for a significant fraction of the execution time. For completeness, the use of bubble memory in associative secondary storage in database applications is described in the aforementioned Chang, Doty, and Lin references.

Figure 5:
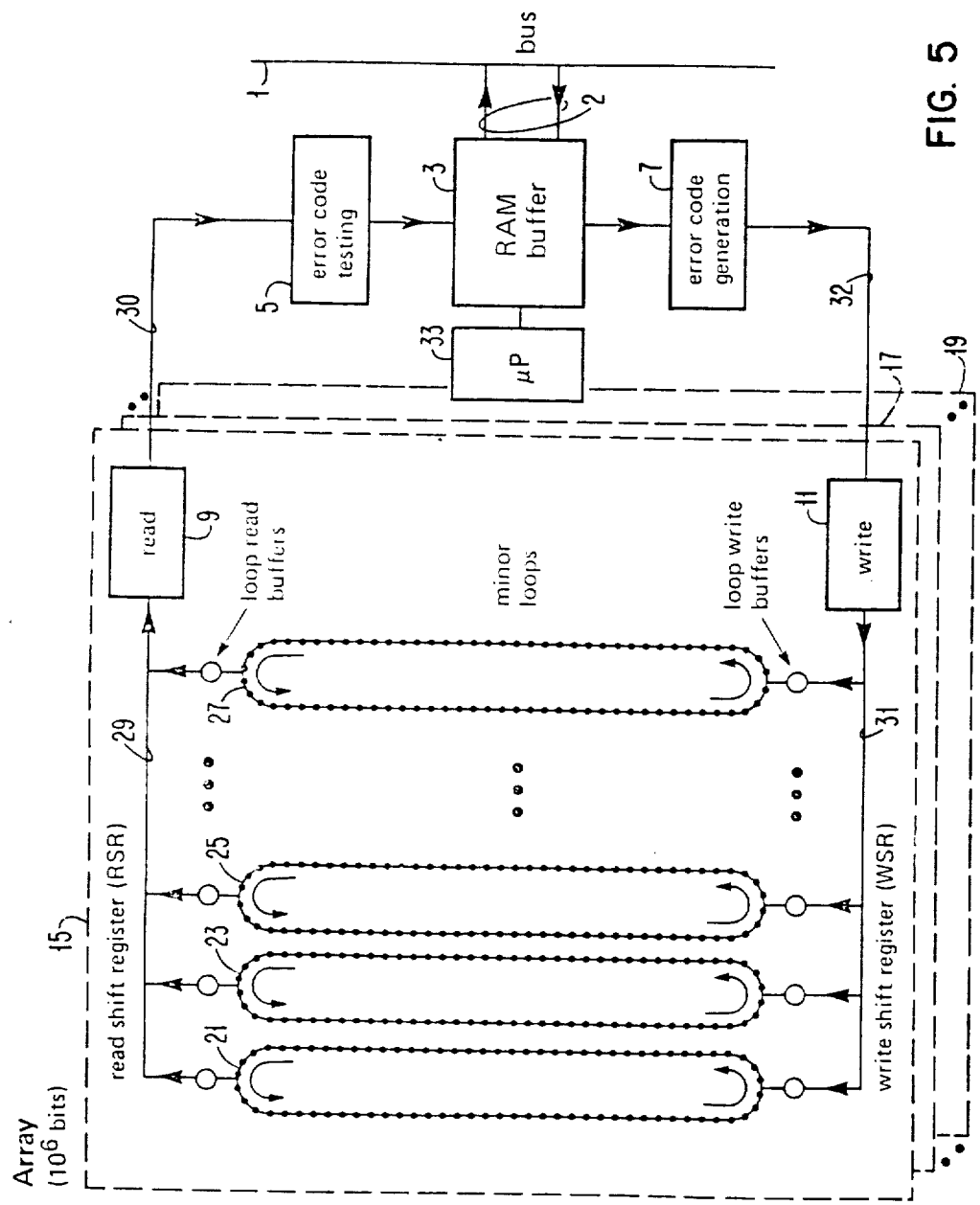
FIG. 5 depicts a typical associative storage card for executing the associative searches of the inventive method.

Referring now to FIG. 5, there is depicted a magnetic bubble memory (MBM) secondary storage device comprising a plurality of carts forming several levels of hierarchy. At the highest level the memory consists of several boxes having multiple hundred megabyte capacity. The boxes may be partitioned into boards which in turn contain several modules which include several chips. The primitive storage unit is termed an array. Each array should have a large with the array is a RAM buffer 3 which serves as a read/write buffer for several of the arrays. Approximately 2,000 bits of RAM storage are dedicated to each one megabit array. An associative search is carried by transferring each record from an array 15 or 17 or 19 to the RAM buffer 3. A microprocessor 33 coupling RAM 3 selects and transfers to bus 1 over path 2 all the records whose key values satisfy the range query. The paths 30 and 32 coupling array 15, for example, to RAM 3 are driven at one megabit per second. Assuming that the array 15 can emit data at that speed from the loops to the RSR, which will be demonstrated subsequently, the entire contents of the array can be searched in one second. Advantageously, all of the arrays can be searched in parallel so that the total time per associative search is one second.

A typical one megabit array 15 consists of up to 1,000 synchronous minor loops 21, 23, 25, 27. Each loop contains magnetic bubbles coded to represent 1,000 bits rotating around the loop in response to a changing magnetic field. In this regard, records are stored across the minor loops. That is, the bits in a record are stored one bit per loop each at the same relative position in the loops. Records containing more than 1,000 bits can be stored by having them extend over several arrays or by being partitioned into contiguous 1,000-bit sections. In either case, each bit in a section is stored in a separate minor loop in the same relative position.

Assuming that the records extend over several arrays, if necessary, all the bits of the record will synchronously arrive at the same point within the loops at the same time. Each read access in a minor loop is assumed to be nondestructive. A read is accomplished by duplicating each bit and loading the duplicate bits into the 1,000 loop read buffers. When the read shift register RSR 29 is empty and available the bits may be loaded into the RSR. Subsequently, the bits may then be shifted sequentially past read head 9. Write operations are accomplished in a similar way using the write shift register WSR 31.

The period of time required for circulation of the minor loops is equal to the time it takes to move the 1,000 bits into the RSR past the read head. This approximates 0.001 seconds. When the shift is completed in the RSR, then the 1,000 loop read buffers have had time to load the next record. Hence, the entire file can be loaded into the RSR and read during 1,000×0.001 seconds=1 second. This corresponds to the time it takes to transfer one megabit from the array 15 to RAM 3. The time per associative search is therefore one second.

If two arrays such as 15 and 17 share a single read path 30, then associative search time would take two seconds rather than one. An associative search on the order of one to two seconds has shown to be quite adequate for sorting performance. The marking technique described subsequently can be used to reduce the effective associative search time to a fraction of a second.

Performance Optimizing Modifications

Economy can be effectuated in both execution time and the magnitude of internal memory required to support the external distribution sorting method of this invention. The method broadly contemplates the three steps. These are (1) random sampling of S keys and internally sorting the S sampled keys; (2) in a single pass forming equal sized partitions of records, each of which can fit within internal CPU memory and constitute a range of key values; and (3) associatively retrieving all of the records whose keys lie within a range and internally sorting said records.

Assume Uniform Distribution of Keys

In the ransom sampling and internal sorting of the sampled keys step, a speed advantage can be obtained by the fast partitioning which occurs when keys are evenly distributed. This is implemented by causing a predetermined portion of internal memory to be bound to the following process. First, the range of $256^K$ possible key values is uniformly divided into approximately cNR/M equal sized intervals for some constant c>1. As each key is processed, the counter for the appropriate interval is incremented. If the first few bytes of each key results in a uniform-like partition, then the pass through the file in the range formation phase can be skipped and the count of the uniform intervals substituted.

Marking Techniques to Assist Internal Sorting

In the step of associatively retrieving all of the records whose keys lie within a range and then internally sorting said records, the search heretofore described required one to two seconds. However, the path coupling the magnetic bubble memory associative store to the CPU may be able to increase its occupancy to transfer M bytes (one internal memory load) in only a fraction of that time. It has been observed that approximately one out of every NR/M records in the file belongs within a predetermined range. Consequently, almost the entire retrieval of records within a predetermined range involves processing records that do not satisfy the range query. The speed of retrieval can be increased by avoiding having to process most of the records. Advantageously, use has been made of one extra bit per record which is stored in the MBM and used as a "mark bit". Records may be either marked or unmarked. The associative store architecture must be modified so that only marked records are transferred from the major loops to the read shift register 29. Each query to obtain keys within a given range of key values takes the form:
Given values a and b retrieve all marked records in the semi-closed range a "key value" ≦ b.

Illustratively, assume that there exists K−1 ordered key values that partition a file into K roughly equal-sized domains. The K−1 ordered key values can be obtained during the combination subphase of the range formation phase. The internal sort phase can be divided into K sequential subphases. In this regard, the ith subphase involves the retrieval and sorting of each range lying within the ith domain formed by the K−1 contiguous key values. Now if at the beginning of the ith subphase all records in the ith domain are marked and all other records are unmarked, then roughly N/K records will be marked at any one time so that the number of processed records in each range retrieval decreases by a factor of K. Each of the K preprocessing steps requires one complete associative search. The total preprocessing time is negligible.

Figure 6:
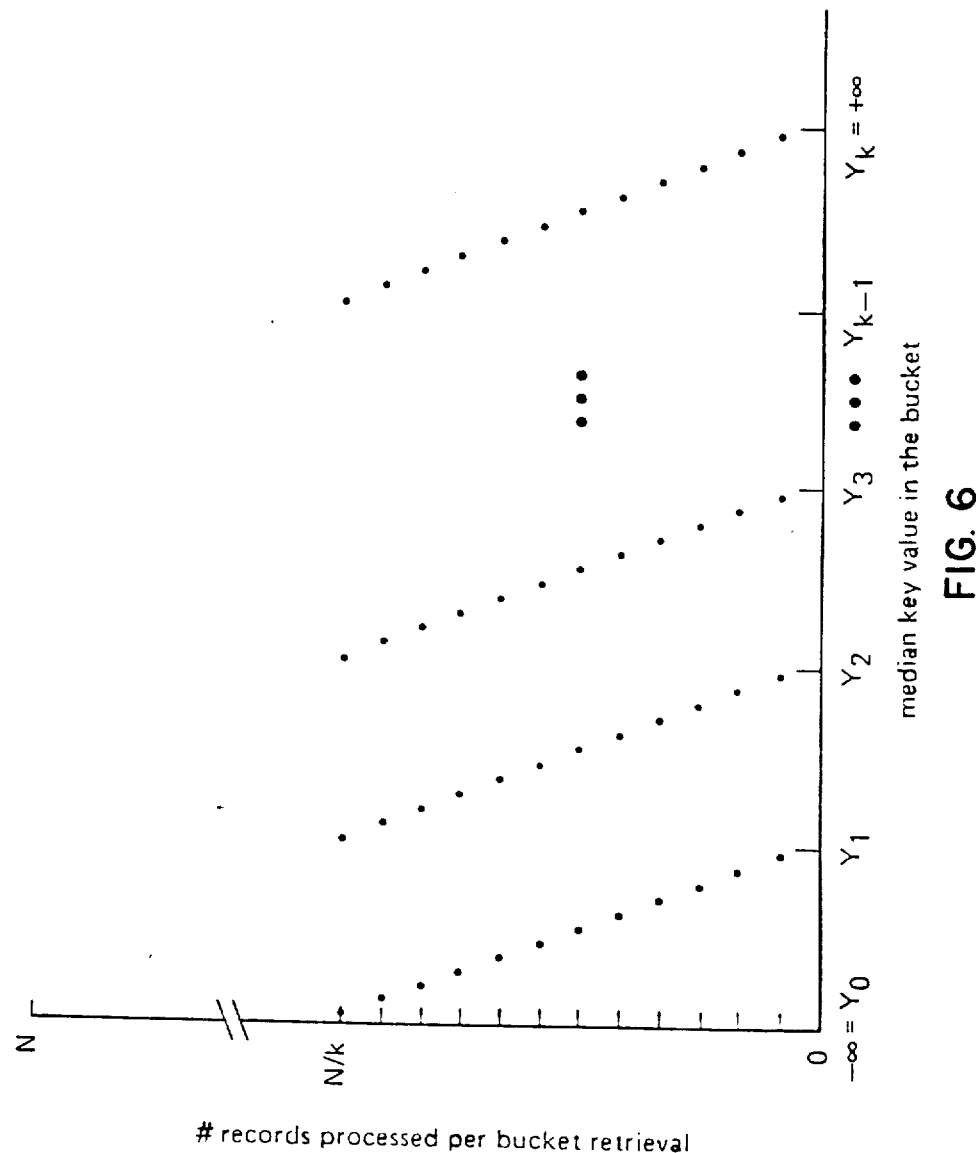
FIG. 6 depicts the marking technique effected.

Even further improvements can be made if during each associative retrieval the marked bits of all the records that satisfy the range query are turned off. Thus, at the beginning of each subphase, roughly N/K records are marked but the number of marked records decreases linearly until it becomes zero at the end of the subphase. This is illustrated in FIG. 6. However, the average number of records that are processed for each associative retrieval is approximately N/(2K).

Parenthetically, the range query can be replaced by the following query that requires only one comparison rather than two:

Given value b, retrieve and unmark all marked records such that "key value" $\leq$ b.

This form of the query is equivalent to the previous one, because by the time the range (a "key value" $\leq$ b) is processed, all the records with a key value less than or equal to a have already been unmarked.

Although a preferred embodiment of this invention has been described, it is understood that numerous variations can be made in the course with the principles of this invention. For instance, experience has shown that the RAM 3 should preferably have extra storage for either extra marked bits or to form a queue of addresses. Further, the storage utilization of the MBM associative store is maximized by either having very small physical records on the MBM so that each logical record of the input file extends over several physical records or else very large physical records so that each physical record contains multiple logical records. The marking technique described earlier is more effective when the physical record size is small compared to the logical record size.

Decreasing CPU Time in the Internal Sort Phase

If the time per associative probe and the final output time for each sorted range are small enough, then the running time of the internal sort phase is dominated by the CPU time, not by the I/O time. In this case the internal sort phase can be made much faster by allocating roughly twice as much space for the internal memory and partitioning it into two halves. The internal memory requirement is increased to $M'=2(M-2(B+B'))$, where M is the previous internal memory size requirement.

It should be noted that the internal sorting of each range is now static, rather than dynamic, so in place of replacement selection we can use static internal sorting methods like quicksort or radix sort, which are roughly twice as fast as replacement selection. The CPU time for the internal sort phase will decrease by approximately 50 percent.

Incorporation of the Sorting Method into a Relational Database System

Currently large databases are stored on DASD in a random access manner and use hashing and index techniques to speed up search time. With the MBM technology described previously, the database can instead by stored on the MBM, thus taking advantage of the faster random access. The same hashing and index techniques can be used. A database system in this setting could process transactions at a greater speed than could a database system stored on DASD.

Additionally, a database stored on MBM can perform general relational database queries quickly, on the order of seconds, by making associative searches. This cannot be accomplished when the database is stored on DASD. In other words, the MBM can be used either as a random access device or as an associative device, whichever is more efficient for the current transaction or query. The sorting method can be viewed as one of the natural operations of the relational database system.

We claim:

1. A method for executing an external distribution sort, the data to be rearranged including N keyed records accessed by a CPU from associative secondary storage, the CPU having predetermined available internal memory of F records capacity, comprising the steps of:

random sampling of S keys, internally sorting the sampled keys within the CPU, and representing the sorted order by a sequential pointer list;

forming equal sized partitions averaging N/S<F records in a single pass by obtaining a histogram of keys and ranges of key values including for each key the step of performing a binary search on the pointer list to ascertain the range associated with the key, and forming S+1 ranges and denoting the sorted key values by $X_1, X_2, \ldots, X_S$ for each value i from one to S+1, the ith range including the set of records whose key value lies in the semi-closed interval $X_{i-1}$ to $X_i$, and combining contiguous lesser populated ranges to form larger ranges such that each partition fits within the CPU internal memory; and associatively retrieving all of the records whose keys lie within a range of a partition and internally sorting said records.

2. A method according to claim 1, wherein said method further includes the modification steps of marking selective records and associatively retrieving only marked records.

3. A new use of a data processor having a central processing unit, an internal memory of capacity M, an associative storage device, and means coupling the memory and the device to the CPU, said new use comprising a method for executing a distribution sort on data including keyed records accessible on the associative device, the method steps include:

random sampling S record keys and sorting the sampled keys;

counting how many records belong to each range defined by the sorted sample, and combining lesser populated contiguous ranges to form larger ranges, each range of which containing roughly the number of records that can fit within the internal memory, in order to estimate the distribution of key values of the records constituting a file in a single pass; and associatively retrieving all of the records whose keys lie within a range and internally sorting the retrieved records.

4. A new use of a data processor according to claim 3, wherein each record has a fixed length of R bytes and each key field consists of K less than R bytes, and further wherein any arbitrary file to be sorted consists of N records, and still further wherein the minimum amount of internal memory is proportional to $$\ln(NR/K) + \ln\left[\frac{\ln(NR/K)}{2} \cdot \frac{NRK}{2}\right]^{\frac{1}{2}}.$$

5. A method for executing an external distribution sort, the data to be rearranged including keyed records accessed by a CPU from associative secondary storage, the CPU having predetermined available internal memory M, the method steps include:

random sampling of S keys and internal sorting of the sampled keys including the step of representing the sorted order by a sequential pointer list;

forming equal sized partitions of records in a single pass by obtaining a histogram of keys and ranges of key values and combining contiguous lesser populated ranges to form larger ranges such that each partition fits within the CPU internal memory, said partition forming step includes the step of performing a binary search on the pointer list in order to ascertain the range associated with the key for each key in the histogram; and associatively retrieving all of the records whose keys lie within a range of a partition and internally sorting said records.

6. A method according to claim 5, wherein the partition forming step further includes the steps of forming $S+1$ ranges and denoting the sorted key values by $X_1$, $X_2, \ldots, X_S$ for each value i from 1 to $S+1$, the ith range including the set of records whose key value lies in the semi-closed interval $X_{i-1}$ to $X_i$.

7. A method according to claim 5, wherein the step of forming of partitions of records includes the steps of processing each key on the associative device and performing a binary search on the pointer list in order to ascertain which small range contains the key, incrementing the count for that range by unity and storing the count for the range in the pointer fields of the key defining the upper limit of the range;

the step of combining contiguous lesser populated ranges to form larger ranges includes the steps of combining small ranges so that the resulting combined range contains at most M/R records, in the event such combined range exceeds M/R, associating a special marker with the key that defines the upper limit of the range designating it as an overflow range.

* * * * *